United States Patent
Khairullah et al.

(10) Patent No.: US 6,730,345 B2
(45) Date of Patent: May 4, 2004

(54) METHOD FOR PREPARING SAUTÉED VEGETABLES

(75) Inventors: Abizer M. Khairullah, Morgan Hill, CA (US); Wade H. Swanson, Modesto, CA (US); Forrest W. Griesbaum, Gilroy, CA (US)

(73) Assignee: Gilroy Foods, Modesto, CA (US)

( * ) Notice: Subject to any disclaimer, the term of this patent is extended or adjusted under 35 U.S.C. 154(b) by 266 days.

(21) Appl. No.: 09/925,785

(22) Filed: Aug. 9, 2001

(65) Prior Publication Data

US 2003/0035881 A1 Feb. 20, 2003

(51) Int. Cl.⁷ .......................... A23L 1/217; A23L 1/224
(52) U.S. Cl. .................. 426/302; 426/385; 426/438; 426/615; 426/640
(58) Field of Search ................................ 426/302, 385, 426/438, 615, 640

(56) References Cited

U.S. PATENT DOCUMENTS 3,962,355 A * 6/1976 Yamazaki et al. .......... 426/640

* cited by examiner

Primary Examiner—Helen Pratt
(74) Attorney, Agent, or Firm—Polsinelli Shalton & Welte

(57) ABSTRACT

The present invention relates to a method for sautéing vegetables, wherein the method includes contacting the vegetables with a sautéing agent, followed by contact with heated air. The present invention also relates to the resultant sautéed vegetable product.

19 Claims, 1 Drawing Sheet

Onions
Flavor Consensus Report

|  | Market Onion (Fiesta) Oil Added No Blanch | Market Onion (Fiesta) No Oil No Blanch | Market Onion (Fiesta) No Oil Blanched | Market Onion (Fiesta) Oil Added - Blanched | Hi Solid Onion (Basic 101) Oil Added - Blanched | Hi Solid Onion (Basic 101) No Oil Added - Blanched |
|---|---|---|---|---|---|---|
|  | 493-20-A | 493-20-B | 493-21-A | 493-21-B | 493-24-A | 493-24-B |
| Overall Aroma | 7.7 | 8.5 | 7.0 | 7.5 | 8.0 | 9.0 |
| Overall Flavor | 9.0 | 9.0 | 9.5 | 8.5 | 9.5 | 10.5 |
| Green/Rooty | 3.0 | 5.0 | 3.5 | 3.0 | 3.5 | 4.0 |
| Dehydrated/Chemical | 2.5 | 3.0 | 3.0 | 2.5 | 3.5 | 3.5 |
| Cooked Onion/Boiled Cabbage | 4.0 | 2.0 | 4.5 | 4.0 | 5.0 | 4.5 |
| Sulfur Off Notes | 0.0 | 2.0 | 0.0 | 0.0 | 0.0 | 2.5 |
| Nasal Pungency | 2.0 | 3.5 | 3.0 | 2.0 | 3.5 | 4.0 |
| Toasted/Browned/Caramelize | 4.0 | 0.0 | 1.0 | 3.0 | 2.0 | 0.0 |
| Sweet | 4.0 | 2.0 | 2.0 | 3.0 | 2.0 | 1.5 |
| Bitter | 2.0 | 2.0 | 2.0 | 1.5 | 2.5 | 2.5 |
| Heat | 2.0 | 3.0 | 2.0 | 1.5 | 2.5 | 3.0 |

Onions
Flavor Consensus Report

|  | Market Onion (Fiesta) Oil Added No Blanch 493-20-A | Market Onion (Fiesta) No Oil No Blanch 493-20-B | Market Onion (Fiesta) No Oil Blanched 493-21-A | Market Onion (Fiesta) Oil Added - Blanched 493-21-B | Hi Solid Onion (Basic 101) Oil Added - Blanched 493-24-A | Hi Solid Onion (Basic 101) No Oil Added - Blanched 493-24-B |
|---|---|---|---|---|---|---|
| Overall Aroma | 7.7 | 8.5 | 7.0 | 7.5 | 8.0 | 9.0 |
| Overall Flavor | 9.0 | 9.0 | 9.5 | 8.5 | 9.5 | 10.5 |
| Green/Rooty | 3.0 | 5.0 | 3.5 | 3.0 | 3.5 | 4.0 |
| Dehydrated/Chemical | 2.5 | 3.0 | 3.0 | 2.5 | 3.5 | 3.5 |
| Cooked Onion/Boiled Cabbage | 4.0 | 2.0 | 4.5 | 4.0 | 5.0 | 4.5 |
| Sulfur Off Notes | 0.0 | 2.0 | 0.0 | 0.0 | 0.0 | 2.5 |
| Nasal Pungency | 2.0 | 3.5 | 3.0 | 2.0 | 3.5 | 4.0 |
| Toasted/Browned/Caramelize | 4.0 | 0.0 | 1.0 | 3.0 | 2.0 | 0.0 |
| Sweet | 4.0 | 2.0 | 2.0 | 3.0 | 2.0 | 1.5 |
| Bitter | 2.0 | 2.0 | 2.0 | 1.5 | 2.5 | 2.5 |
| Heat | 2.0 | 3.0 | 2.0 | 1.5 | 2.5 | 3.0 |

FIG. 1

METHOD FOR PREPARING SAUTÉED VEGETABLES

FIELD OF INVENTION

The present invention relates to a method for sautéing vegetables and the resultant vegetable product. In particular, the present method uses heated air to sauté and dry the vegetables.

BACKGROUND OF INVENTION

Traditionally, to sauté a vegetable, such as an onion, it was necessary to heat a small amount of oil in a shallow pan. The vegetables or onions were then added to the pan to quickly sear the vegetables to seal in the natural juices and prevent rapid dissipation of moisture. This is a well-known method that is practiced in homes and commercial restaurants throughout the world. The resultant flavor of the sautéed vegetables is considered desirable and such vegetables are typically used in a variety of different recipes. For these reasons, it is desired to be able to produce sautéed vegetables on an industrial scale. It is not practical, however, to pan-sauté all vegetables for use on an industrial scale. This would be too labor-intensive and would require vast amounts of equipment. As such, it is desired to have a method for producing large quantities of sautéed vegetables that is not labor-intensive and does not require an extraordinary amount of equipment.

To produce a vegetable, especially an onion, that has a sautéed-like character, it has been known to fry the onion. Frying, however, results in a different product. When frying a product, it is cooked in excess fat, which results in a darker color and different flavor profile. Conversely, sautéing cooks with a minimum amount of fat. As such, it is desired to have a method for sautéing, not frying.

Another problem associated with sautéed vegetables is that the water activity levels traditionally remain high enough to support bacteria and fungus growth. As such, in order to produce a product that can be easily sold on an industrial scale, the resultant product is preferably frozen, dried, or treated with preservatives. If the product is to be further dehydrated, it will preferably achieve a water activity and moisture level equal to or less than 0.5 and a total moisture percentage less than 7%. Other water activity levels can be used so long as microbial activity is sufficiently suppressed. Thus, it is further desired to have a method that can produce a sautéed vegetable that can be stored for long periods of time without supporting bacterial and fungal growth.

SUMMARY OF INVENTION

The present invention relates to a method for sautéing vegetables, in particular, onions, whereby a sautéed vegetable product is produced. The method is unique because a traditional frying pan, or similar object, whereby the vegetables are only directly contacted by a heated surface, is not used. Instead, the vegetables are coated with a sautéing agent and subjected to an amount of heated air, whereby they are sautéed. In the process, the vegetables will also be partially dried. How much water remains in the sautéed vegetable depends upon the desired character of the finished product. If processing with the heated air is continued after the vegetables have been sautéed, a product having a lesser moisture level is produced.

The present method includes the steps of reducing the size of the vegetable, coating the vegetable with a sautéing agent, and exposing the coated vegetable to an amount of heated air for a period of time sufficient to produce a sautéed vegetable. The sautéed vegetable will be at least partially dry, with increased exposure to the heat resulting in increased drying and a reduction in total moisture. Sautéing will cause the resultant sautéed vegetables, preferably onions, to have some of the sugars caramelized, which will impart the sautéed flavor to the finished product. Optionally, a blanching step can be included.

Additional drying steps can be performed, if necessary, to produce a sautéed product having a significantly reduced moisture level. Such additional steps are designed to remove additional moisture or to allow the sautéed vegetable product to be stored for a period of time. In the alternative, the vegetable can be dried to a lesser extent and frozen to produce a partially dry and frozen product. A different alternative is to produce an intermediate moisture product. If an intermediate moisture product is produced, agents for suppressing microbial and fungal activity may be added thereto.

The present invention is advantageous because it relates to an industrial process, whereby large quantities of vegetables can be treated and sautéed. In particular, the traditional method, which is labor intensive and requires a pan or similar object, is eliminated. The present method allows for the treatment of literally thousands of pounds of vegetables in a day, without a significant increase in labor and equipment. The resultant process is also advantageous because it actually sautés the vegetables as opposed to frying them. A fried product will have a different flavor and texture than a sautéed product.

BRIEF DESCRIPTION OF DRAWINGS

FIG. 1 is a summary of the results discussed in Example 4.

DETAILED DESCRIPTION

The present invention relates to a method for preparing sautéed vegetables and the resultant vegetable product, especially a sautéed onion product. In particular, the present invention relates to a method whereby large quantities of vegetables are reduced in size, sprayed or coated with a sautéing agent, and sautéed in a heated air system, preferably a convection air dryer. During the sautéing process, the vegetables are dried, resulting in a product that has a sautéed flavor and a decreased moisture content. A resultant product is produced that has a desirable taste, as a result of sautéing, and a decreased water content.

The present method is initiated by obtaining a single vegetable or a large quantity of vegetables. Any amount of vegetables can be treated; however, it is preferred to treat large quantities, as this is part of an industrial process. It is preferred to process a large quantity of vegetables, at least about 500 lbs/day. The vegetables can be prepared as part of a batch process or a continuous process. Once the vegetable or vegetables are obtained, they are cleaned and reduced in size to produce vegetable parts. As an example, cleaning of onions includes removing the stems and tops. Generally, the vegetables will be cut or sliced. If the vegetables are already cut or reduced in size, then such a step is not necessary. The cut or sliced parts can range in size from minced or small diced particles having a size equal to approximately ⅛ inch cubed, to slices, which are equal to either the length or width of the vegetable. Preferably, the vegetables are cut or chopped into smaller particles because the product will later be used in cooking processes that require smaller particles.

Any of a variety of cutting or slicing devices can be used to reduce the size of the vegetables.

Once the sliced or chopped vegetables are obtained, they can be optionally blanched. The blanching step impacts the flavor of the end product and is considered useful to the present process. In particular, blanching reduces sulfur off notes found in the finished product, especially onions. Besides removing sulfur off notes, blanching reduces raw notes, bitterness, and green grassy notes. The blanching step can be performed at any of a variety of times and temperatures, as long as the resultant vegetable is blanched. It is preferred, however, to blanch the vegetables for about 60 seconds, at a product temperature ranging between 180° F. and 190° F. As would be expected, the blanching step is achieved by contacting the vegetables with water heated in any fluid state to near or above the recited temperature.

Regardless of whether the vegetables are blanched, they are next sprayed with a liquid sautéing agent. The sautéing agent can be selected from any of a variety of lipids and lipid substitutes, in particular edible oils and fats, as long as a desired flavor is imparted to the resultant vegetable product and the agent allows the vegetable to be sautéed. Sautéing will result in the caramelization of some of the sugars and starches found in the vegetable. As such, the sautéing agent helps facilitate this caramelization process. Among the suitable edible oil sautéing agents will be butter, margarine, olive oil, canola oil, vegetable oil, and any of a variety of other fats, fat substitutes, and edible oils. Flavors can be added to the oils or fats. The sautéing agent is added in an amount sufficient to lightly coat the chopped vegetables. Typically, a spray device, or atomizer, is used to project the liquid sautéing agent onto the chopped vegetables. The vegetables should be evenly coated with the sautéing agent.

Once the vegetables are coated with the sautéing agent, they are then sautéed. During the sautéing process, the vegetables will also be partially dried. The sautéing step is achieved by passing the chopped and cooked vegetables into a device that contacts the vegetables with heated air. Importantly, the method uses heated air to primarily sauté the vegetables, as opposed to the traditional method, which contacts the vegetables with a heated surface. Any of a variety of temperatures, air speeds, times, and devices can be used. The most preferred device for use in the present method is a convection air dryer. The vegetables in the convection air dryer, or similar device, will only be in part contacted directly with a heated surface. Instead, the heated air will be the primary cause of the vegetables being sautéed and dried, as opposed to a heated surface.

The preferred temperature for use in the convection air dryer, as well as most other air heater devices, will range between about 250° F. and about 400° F. More preferably, the temperature will range between about 280° F. and about 320° F. Any temperature can be used, however, as long as a sufficient air temperature is achieved to sauté the vegetable.

The vegetables are sautéed for between about 60 minutes and about 60 minutes, during the initial sautéing and drying step. More preferably, the sauté time ranges between about 10 minutes and about 30 minutes. Different times can be used, depending upon the air temperature and product. Air speed varies between about 250 cfm/ft$^2$ and about 50 cfm/ft$^2$ depending upon the stage of drying. Also, it is preferred to periodically change air direction to ensure uniform sautéing. The initial temperature and sautéing time can vary, dependent upon the desired resultant moisture level. When exiting the sautéing step, the vegetables will typically have approximately half of the total water eliminated.

As mentioned, any of a variety of devices can be used to sauté the vegetables. Importantly, heated air must be contacted with the vegetables to sauté and dry them. After sautéing, the devices can further be used to dry the sautéed product. Any of a variety of commercially available convection air dryers may be used to sauté the vegetables. As such, it is preferred to use a convection air dryer. However, any device can be used that contacts the vegetables with heated air.

A fluidized bed dryer, for example, can be used. Dryers with fluid bed characteristics (Wolverine Dryer) can have increased air speeds to achieve rapid sautéing and drying rates. Dryer temperatures at higher air speeds can range between ambient temperatures and 250° F. The temperature depends on how much heat can be applied without scorching the vegetable, and the desired water removal rate to obtain the desired finished quality. Regardless, this is contrary to the normal process of sautéing, which involves exposing the chopped vegetables to a heated metal surface.

A convection air dryer is also known as a belt dryer. Commercial manufacturers of conventional belt dryers include Proctor & Schwartz, Midland & Ross, and National. The air speed of the belt dryer can be adjusted, depending on the drying zone air direction (upflow air or downflow air), and if the drying bed is adversely affected by high air velocity (blow holes, etc.). The vegetables are placed on a perforated belt, which typically has between 20% to 40% open area. This allows the air to move freely through the belt and in between all the pieces to result in even convection sautéing and drying. There is also partial conductive heating due to direct contact of the bottom layer of the product with the metal portion of the perforated belt. But the significant portion of the sautéing/drying step, is mainly due to convective heating. Adjustment of different air speeds allows for the use of different air temperatures. Generally, in a conventional belt dryer, the higher temperatures are applied to the air in the initial drying zone where evaporative cooling prevents the product from overheating.

After the initial sautéing and drying step, the drying rates (lbs. of water/ft$^2$/hr) must be lowered. As the product becomes more dehydrated, moving into subsequent drying stages, the air drying temperatures, air velocities, and drying rates all are reduced to match the drying characteristics of the product with the falling moisture content (increasing dryness).

Once the sautéing step is finished, the sautéed and dried vegetables can be further treated. The additional treatment includes any of a variety of methods. The first is to freeze the sautéed and dried vegetables. An IQF (individually quick frozen) method is preferred. The preferred temperature for freezing the vegetables ranges between about −20° F. and −50° F. The preferred freezing time ranges between about 5 minutes and one hour. The frozen product is then available for use, whereby the product is simply thawed and placed in a food product. Such product will have no further moisture removal. In a conventional fluid bed freezer, the freezing time and rate are dependent on airflow and air temperatures, as well as the material being frozen. In the alternative, a forced air freezer can be used that has air temperatures as low as −50° F., with high airflows creating IQF pieces in 5–10 minutes. Liquid immersion freezers can be used. The immersion freezer contacts product with a refrigerant solution (i.e. Liquid Nitrogen, etc.), which freezes the product almost instantaneously. As such, the sautéed vegetables prepared from this process can be rapidly or slowly frozen, using any number of freezing techniques.

Alternatively, the dried and sautéed vegetables can be further dried to lower the moisture level. The additional drying will be conducted at a temperature ranging between ambient and 250° F. The time will range between 2 and 24 hours. Also, during the process, the vegetables should be fluffed periodically. Upon further treatment, the additional drying step will result in a moisture level in the dried and sautéed products equal to about 7% or less of the total weight of the vegetable. It is important to achieve a dehydration level equal to 7% or less because this is the level at which there is insufficient available water to allow or promote microbial or fungal growth. The 7% level generally is desired to achieve a sufficiently low water activity level. The final dehydrated product should be dried to a water activity (Aw) equal to or less than about 0.5. This is sufficient to assure shelf stability with most dehydrated products. It is also possible to over dry product to predispose dehydrated product to storage oxidation. In this application, sautéed vegetables are dehydrated to an optimum moisture to achieve storage stability.

The moisture level can be higher, 10% to 15%, but this moisture range would cause detrimental quality changes. If such an increased amount of moisture is selected, then an intermediate moisture product is produced. If this is done, preservatives and other methods and compositions can be used with or added to the product.

Freeze drying of the frozen sautéed product is an alternative to the discussed drying methods. In this process, the vegetables are sautéed, partially dried, frozen, and then freeze dried to remove the remaining moisture. Such process can be conducted shortly after the vegetables are sautéed, or after the vegetables have been significantly dried.

The vegetables suitable for use in the present process include onions, garlic, mushrooms, and bell peppers. Onions are the most preferred vegetables for use in the present method.

An anti-oxidant can be added to the finished vegetable product. It is also possible to use a MAP (modified atmospheric pressure) process with this product.

The entire process recited herein can be a batch or continuous process. It can also be a combination of the batch and the continuous processes.

EXAMPLES

Example 1

Approximately five pounds of whole onions were obtained. The onions were treated manually with knives to remove the roots, tops, and skins. The onions were then hand-washed with running water from a hose. After washing, the onions were diced using a Urschell model G dicer whereby the onions were cross-cut at a length of between 1 and 1.5 inches and a width of ⅜th of an inch. Five pounds of the sliced onions were then placed in a lab blancher basket. They were steamed for one minute, with the product having a surface temperature of about 190° F. A second batch of onions equaling five pounds was also blanched. The cut and blanched onions were then mixed together and sprayed with 227 grams of butter flavored margarine. The margarine was evenly distributed over the onions with a spatula. The onions were then transferred to a lab convection drier with the product added to about an inch and a half in depth. The onions were sautéed at 300° F. for 12 minutes, whereby heated air was blown up across the onions. They were then air-dried at 300° F. for another 12 minutes whereby the air was blown down over the onions. The change in airflow was done to ensure even heating and drying.

The resultant sautéed onions had a 45% yield by weight. As such, approximately 55% of the total weight of the untreated onion was lost. Nearly all of this weight loss is attributable to moisture loss.

Example 2

The onions of Example 1 were placed in a lab storage freezer and spread on a tray to simulate IQF freezing. After one hour the product was placed in a plastic bag and shaken to make IQF pieces. The resultant IQF onion had a good flavor and was well suited for industrial uses.

Example 3

The onions of Example 1 were further dried at 220° F. for 14 minutes with the air flowing upward, followed by air drying at 195° F. for 14 minutes with the air flowing downward. Again, the air direction was changed to ensure even drying. The onions were then removed from the tray and hand stirred to fluff. The onions were further dried at 155° F. for 45 minutes with the air flowing upward. The onions were then hand-stirred to fluff them and were dried at 140° F. for an additional two hours. The resultant weight of the onions was 1.35 pounds. As can be seen, there was a significant moisture loss in the onions. The resultant onions had a total moisture content equal to about 7%.

Example 4

The present example recites how the flavor of the treated product of Example 1 was evaluated. To initiate the method, 5 highly trained descriptive panelists led by a panel leader were selected. Their observations were entered into an Excel (Office 97) spreadsheet and proofed for accuracy. The samples, formed according to Example 1, were evaluated once each for flavor and aroma. The panelists measured 10 flavor attributes and 1 aroma attribute.

Samples were coded with three-digit random numbers and presented in random order. They were evaluated using a 15-point intensity scale divided into 0.1 point increments, with zero indicating no measurable effect, and 15 indicating an extremely strong effect. A 0.5 difference indicates a statistically significant change. After evaluating the samples individually, the group reviewed the data and agreed, on consensus, scores for each of the attributes.

All of the above test samples were dehydrated. For aroma analysis, they were presented dehydrated in lidded, 2-oz. cups.

For flavor analysis, the onions were rehydrated in beakers with boiling Milli-Q water. After rehydration, the excess water was drained, and onions were presented in 2-oz cups.

The following references were provided to the panelists during training and evaluation:

Standard Solutions:
2% sucrose, sweet 2
5% sucrose, sweet 5
0.05% caffeine, bitter 2
0.08% caffeine, bitter 5
Mott's Applesauce, cooked apple 5
Minute Maid Orange Juice, orange 6.5
Welch's Grape Juice, grape 10
Additional Flavor References:
Yellow onion, chopped, raw
Yellow onion, chopped, sautéed (no oil)
Yellow onion, chopped, boiled Cain's (dehydrated) Chopped Onion Flakes
Cain's (dehydrated) Chopped Onion Flakes, rehydrated with water
McCormick Onion Powder
Proctor & Gamble Pringles Original potato chips
Old London White Melba Toast
0.16% Tabasco, heat 5
0.05% Cain's Salad Grind Black Pepper
Lay's Classic Potato Chips
Rinsing Agents:
Sliced cucumbers
Kraft Philadelphia Cream Cheese
Nabisco Unsalted Saltine Crackers
Sliced apples
The description of the flavor and aroma are as follows:

| | Aroma |
|---|---|
| Overall: | The sum total of the sensory impressions (sensations) of the food, by smelling or sniffing. |
| | Flavor |
| Overall: | The sum total of the sensory impressions of the food by tasting flavor intensities. |
| Green/Rooty: | Earthy, fresh green aromatics associated with raw onion, which include earthy/dirty, rooty, and raw/green. Example: Chopped raw onion. |
| Dehydrated/ Chemical | The aromatics associated with dehydrated onion that can include mercaptans, skunky, and a chemical impression. Typically, no fresh raw notes, sweet or browned. Example: Dehydrated onion flakes, onion powder. |
| Sulfur/Boiled Cabbage | The aromatics associated with products containing hydrogen sulfide compounds and off flavors developed during cooking. Cooked cabbage has a slightly sulfurous character as in dimethyl sulfide. Example: Boiled onion, boiled cabbage. |
| Nasal Pungency: | A burning feeling in the nasopharynx. Example: Kraft prepared horseradish (fresh). |
| Toasted/Browned/ Caramelized: | Aromatics associated with reactions of amino acids and reducing sugars and/or the caramelization of reducing sugars when heated. Example: Sautéed onion. Reference: Pringles 3.5, Melba toast 5.5. |
| Sweet: | One of the four basic tastes caused by stimulation of receptor sites by compounds that include sucrose, aspartame, saccharine, etc. Example: Table sugar. Reference: 5% solution of sucrose in MilliQ water 5.0. |
| Bitter: | Basic taste with receptors concentrated in back of throat. Example: Black coffee. Reference: 0.08% solution of caffeine in MilliQ water 5.0. |
| Heat: | Feeling factor of long lasting warmth coating entire mouth. Example: Red pepper sauce, brown spices. Reference: Solution of .05% salad grind black pepper in MilliQ water 2.5, solution of 0.16% Tobasco in MilliQ water 5.0. |

The results of the products tested were as follows:

Sweet Onion, No Blanch: Oil Added (20A) v. No Oil (20B). When comparing unblanched sweet onion, the oil-added sample had slightly lower aroma intensity because it exhibited a smoother sautéed onion smell rather than the sharper raw onion and sulfur aroma of the no-oil version.

In flavor analysis, these two products had the same overall intensity, but the individual components comprising the overall were quite different. The no-oil sample was identified by its prominent raw onion impression with accompanying heat and pungency, while the oil-added sample presented only slight levels of these attributes, instead exhibiting an elevated mild cooked onion flavor. Adding oil created a highly caramelized and sweet product, while the no-oil version was totally lacking in caramelization and had low sweetness. The no-oil sample presented an objectionable sulfur note, different from the sulfur normally found in onions, while adding oil eliminated this attribute. These two products had the same low-range bitterness and were similar in dehydrated/chemical notes, with the no-oil product being slightly elevated.

Sweet Onion, Blanched: Oil Added (21B) v. No Oil (21A). Although the aroma intensity of these two products were similar, the oil-added sample was slightly stronger due to its sweet sautés onion aroma, which gave a more full-bodied impression than the dehydrated notes found in the no-oil version.

In flavor analysis, the no-oil product had a more potent overall impact than the oil-added version, boosted by its higher levels of raw, dehydrated, and cooked onion flavors, accompanied by pungency and heat. The oil-added sample was dramatically higher in browned/caramelized and sweet taste, which combined with the cooked onion flavor to give a sautéed onion impression. The sample lacking oil was slightly more bitter than the oil-added product.

High Solids Onion: Oil Added (24A) v. No Oil (24B). In aroma evaluation, the no-oil product was far more intense overall than its oil-added counterpart, boosted by the sharp dehydrated and raw onion aroma and the strong sulfur smell. By contrast, the oil-added product had more browned, sautéed onion aroma, with a diminished dehydrated note.

In flavor analysis, the overall impact of the no-oil product was significantly higher than the oil-added version. The no-oil sample exhibited a higher raw onion impression, accompanied by elevated pungency and heat effects. The no-oil product had a significant unpleasant sulfur flavor, different from the sulfur intrinsic to onions, that was lacking in the oil added sample. The product with additional oil exhibited a noticeable browned/caramelized flavor, which the no-oil version lacked, and this attribute elevated its sweetness. The no-oil sample had a notable boiled onion impression, while the oil-added product took on a boiled cabbage flavor. All panelists noticed a scorched flavor in the no oil-added sample, which contributed to its bitterness, and some commented on a lingering heat sensation and an increased onion aftertaste. The addition of oil produced a more caramelized and slightly sweeter product, but both samples were equally bitter.

Sweet Onion, Oil Added: Blanch (21B) v. No Blanch (20A). These products were very similar in overall aroma intensity and character: both smelled toasted/browned/caramelized, reminiscent of sautéed onion, with very little dehydrated or raw onion notes, and no off-aroma.

In flavor analysis, the overall intensities were comparable, although the unblanched version was slightly higher due to its increased browned/caramelized and sweetness, and statistically significant more bitterness and heat. These two products were identical in the onion character components: they were primarily a cooked onion flavor with green/rooty and dehydrated undernotes. These products exhibited no sulfur off-notes, and both had a slight nasal pungency.

Sweet Onion, No Oil; Blanch (21A) v. No Blanch (20B). These two products were similar in overall aroma intensity, with the unblanched version slightly higher due to a sulfur odor that the blanched sample lacked. They both smelled like brown/caramelized onions with a sweet note.

In flavor analysis, the overall intensities were comparable, but the blanched version was less green/rooty and higher in cooked onion, while the unblanched sample presented a slight sulfur off-note. The unblanched sample was slightly higher in nasal pungency and heat, while the blanched sample contained only had a trace of browned/caramelized flavor. These products were equally sweet and bitter.

Aroma. In contrast to flavor evaluation, where panelists used intensity reference scales for each individual flavor, only one aroma attribute, overall aroma, was scored in the balloting process. Panelists noted differences in the aroma character in each sample, but frequency of detection doesn't necessarily reflect the intensity of each aroma attribute. It is important to note that aroma attributes aren't always consistent with flavor attributes in a single sample. Although only one aroma attribute, overall aroma, was included in the evaluation, panelists noted differences in the character of the aroma in the different samples.

20-A (Low Solid Sweet Onion, No Blanch, Oil Added). This sample had a mid-range aroma intensity, primarily consisting of onion and, secondarily, of toasted/browned/caramelized. The onion character was like a "sautéed" onion, with sweet, green, and dehydrated undertones.

20-B (Low Solid Sweet Onion, No Blanch, No Oil). This onion had the second-highest overall aroma intensity with onion smell, primarily dehydrated, being noted by all panelists. This product had a significant sulfur smell, with rooty, sweet, and green notes reminiscent of a raw onion.

21-A (Low Solid Sweet Onion, Blanched, No Oil). This product had the lowest overall aroma of the group, with browned/caramelized and onion being the most frequently noted aromas, followed by sweet and dehydrated.

21-B (Low Solid Sweet Onion, Blanched, Oil Added). This product had the second lowest aroma impact, with brown/caramelized being the most significant attribute. The onion aroma was similar to a sautéed onion, with sweet and rooty notes.

24-A (High Solids Onion, Oil Added). This sample had a mid-range aroma intensity, with the onion component described as sautéed, browned, and sweet, with toasted and green undernotes and very little dehydrated aroma.

24-B (High Solids Onion, No Oil). This sample had the highest aroma impact of the group, comprised primarily of dehydrated onion and sulfur. It also displayed green and browned aromas, with dusty/dirty and rooty notes.

The above results are shown in FIG. 1. It was concluded that the addition of oil eliminated the unpleasant sulfur odor and diminished the raw onion aroma, while adding a rich brown/caramelized aroma. The addition of oil also diminished the sulfur, raw onion, and dehydrated onion flavors, resulting in a product that tasted more like cooked or sautéed onions with elevated browned/caramelized flavors.

Blanching the onion created a product with a milder aroma, but similar overall flavor intensity to the unblanched version. Regardless of the process, the high solids onion resulted in a more intense product than did the sweet onion, and it possessed some undesirable qualities. The addition of oil tempered some of these attributes. As such, it is preferred to blanch the vegetables, as well as treat with oil.

Example 5

Approximately ten pounds of peeled garlic cloves were obtained. The garlic cloves were at 0.080" to 0.090" thickness, then hand-washed with running water from a hose. After washing, the cloves were sliced using an in-house slicer. Five pounds of sliced garlic was then placed in a lab blancher basket. They were steamed for one minute, with the product having a surface temperature of about 190° F. A second batch of garlic slices equaling five pounds was also blanched. The cut and blanched garlic slices were then mixed together and sprayed with 227 grams of butter flavored margarine. The margarine was evenly distributed over the garlic with a spatula. The garlic slices were then transferred to a lab convection dryer with the product added to about ¾" to 1" in depth. The garlic was sautéed at 300° F. for 4 minutes, whereby heated air was blown up across the garlic slices. They were then air-dried at 300° F. for another 4 minutes whereby the air was blown down over the garlic slices. The change in airflow was done to ensure even heating and drying.

The resultant sautéed garlic had a 60% yield by weight. As such, approximately 60% of the total weight of the untreated garlic was lost. Nearly all of this weight loss is attributable to moisture loss.

Thus, there has been shown and described a method for preparing sautéed vegetables, which fulfills all the objects and advantages sought therefore. It is apparent to those skilled in the art, however, that many changes, variations, modifications, and other uses and applications for the sautéed vegetables are possible, and also such changes, variations, modifications, and other uses and applications which do not depart from the spirit and scope of the invention are deemed to be covered by the invention, which is limited only by the claims which follow.

What is claimed is:

1. A method for preparing sautéed onions, wherein said method comprises:
   (a) cutting at least one cleaned, whole onion to produce onion parts;
   (b) coating said onion parts with a sautéing agent;
   (c) sautéing said onion parts by contacting with an amount of heated air at a temperature ranging between about 250° F. and about 400° F. for between about 6 minutes and about 60 minutes to produce sautéed onion parts; and,
   (d) treating said sautéed onions, wherein said treatment is selected from the group consisting of freezing, drying, freeze drying, treating with preservatives, and combinations thereof.

2. The method of claim 1, wherein said onion parts range in size from ⅛-inch cubed pieces to slices.

3. The method of claim 1, wherein said sautéing agent is selected from the group consisting of lipids and lipid substitutes.

4. The method of claim 3, wherein said sautéing agent is selected from the group consisting of edible oils, butter, and margarine.

5. The method of claim 1, wherein said method comprises blanching said onion parts for 60 seconds at a product temperature ranging between about 180° F. and about 190° F. to produce blanched onion parts.

6. The method of claim 1, wherein said cutting step comprises slicing, dicing, and chopping.

7. The method of claim 1, wherein said method comprises drying said onion for an additional period of time ranging between 2 hours and 24 hours.

8. The method of claim 1, wherein said method comprises quick freezing said onion.

9. The method of claim 1, wherein said method comprises sautéing at an air speed ranging between about 50 cfm/ft$^2$ and about 250 cfm/ft$^2$.

10. The method of claim 1, wherein said method comprises sautéing for a time ranging between 10 minutes and 30 minutes, with said temperature ranging between about 280° F. and about 320° F.

11. A method for preparing sautéed vegetables, wherein said method comprises:
   (a) cutting a cleaned, whole vegetable to produce vegetable parts;
   (b) coating said vegetable parts with a sautéing agent;

(c) sautéing said vegetable parts by contacting with an amount of heated air at a temperature ranging between about 250° F. and about 400° F. for between 6 minutes and 60 minutes to produce sautéed vegetable parts; and, (d) treating said sautéed vegetables, wherein said treatment is selected from the group consisting of freezing, drying, freeze drying, treating with preservatives, and combinations thereof.

12. The method of claim 11, wherein said method comprises blanching said vegetable parts to produce blanched vegetable parts.

13. The method of claim 11, wherein said vegetables are selected from the group consisting of onions, garlic, mushrooms and bell peppers.

14. The method of claim 11, wherein said sautéing agent is selected from the group consisting of lipids and lipid substitutes.

15. The method of claim 11, wherein said method comprises sautéing at an air speed ranging between about 50 cfm/ft$^2$ and about 250 cfm/ft$^2$.

16. The method of claim 11, wherein said method comprises sautéing for a time ranging between 10 minutes and 30 minutes, with said temperature ranging between about 280° F. and about 320° F.

17. A sautéed onion, wherein said sautéed onion has an amount of total moisture equal to or less than 7% by weight, a portion of some sugars found in said onion are caramelized, said onion ranges in size from ⅛ inch pieces cubed to slices, a sautéing agent is present, said onion has been blanched, and said onion is frozen.

18. A sautéed vegetable, wherein said sautéed vegetable has an amount of total moisture equal to or less than 7% by weight, a portion of some sugars found in said vegetable are caramelized, said vegetable ranges in size from ⅛ inch pieces cubed to slices, a sautéing agent is present, and said vegetable is frozen.

19. A method for preparing sautéed vegetables, wherein said method comprises:

(a) coating an amount of vegetable parts with a sautéing agent; and, (b) sautéing said vegetable parts by contacting with an amount of heated air at a temperature ranging between about 250° F. and about 400° F. for between about 6 minutes and about 60 minutes to produce sautéed vegetable parts.

* * * * *

UNITED STATES PATENT AND TRADEMARK OFFICE
CERTIFICATE OF CORRECTION

PATENT NO. : 6,730,345 B2
DATED : May 4, 2004
INVENTOR(S) : Abizer M. Khairullah, Wade H. Swanson and Forrest W. Griesbaum It is certified that error appears in the above-identified patent and that said Letters Patent is hereby corrected as shown below:

Column 3,
Line 56, delete "60", and insert -- 6 -- therefor.

Signed and Sealed this

Thirtieth Day of November, 2004

JON W. DUDAS
*Director of the United States Patent and Trademark Office*